United States Patent
Bouillon et al.

(10) Patent No.: US 10,988,417 B2
(45) Date of Patent: Apr. 27, 2021

(54) COMPOSITE MATERIAL PART

(71) Applicant: SAFRAN CERAMICS, Le Haillan (FR)

(72) Inventors: Eric Bouillon, Moissy-Cramayel (FR); Aurélia Clerambourg, Moissy-Cramayel (FR); Lisa Pin, Moissy-Cramayel (FR); David Marsal, Moissy-Cramayel (FR)

(73) Assignee: SAFRAN CERAMICS, Le Haillan (FR)

( * ) Notice: Subject to any disclaimer, the term of this patent is extended or adjusted under 35 U.S.C. 154(b) by 0 days.

(21) Appl. No.: 16/099,922

(22) PCT Filed: May 11, 2017

(86) PCT No.: PCT/FR2017/051128
§ 371 (c)(1),
(2) Date: Nov. 8, 2018

(87) PCT Pub. No.: WO2017/194886
PCT Pub. Date: Nov. 16, 2017

(65) Prior Publication Data
US 2019/0152861 A1 May 23, 2019

(30) Foreign Application Priority Data
May 11, 2016 (FR) ........................... 1654200

(51) Int. Cl.
| | | |
|---|---|---|
| C04B 35/185 | (2006.01) | |
| C04B 35/16 | (2006.01) | |
| C04B 35/80 | (2006.01) | |
| C04B 35/624 | (2006.01) | |
| C04B 35/628 | (2006.01) | |

(Continued)

(52) U.S. Cl.
CPC ............ C04B 35/185 (2013.01); C04B 35/16 (2013.01); C04B 35/624 (2013.01);
(Continued)

(58) Field of Classification Search
CPC ................................................... C04B 35/803
See application file for complete search history.

(56) References Cited

U.S. PATENT DOCUMENTS

| | | | |
|---|---|---|---|
| 2005/0129973 A1 | 6/2005 | Eaton et al. | |
| 2014/0273681 A1 | 9/2014 | Chamberlain et al. | |
| 2018/0044249 A1* | 2/2018 | Taillet | C04B 35/80 |

FOREIGN PATENT DOCUMENTS

| | | |
|---|---|---|
| CN | 103755344 A | 4/2014 |
| CN | 104446670 A | 3/2015 |

(Continued)

OTHER PUBLICATIONS

JP-02296770, machine translation (Year: 1990).*

(Continued)

*Primary Examiner* — Karl E Group
(74) *Attorney, Agent, or Firm* — Pillsbury Winthrop Shaw Pittman LLP

(57) ABSTRACT

A part made of composite material includes fiber reinforcement including silicon carbide fibers presenting an oxygen content less than or equal to 1 % in atomic percentage; and a matrix present in the pores of the fiber reinforcement and including at least one sintered silicate phase including at least one rare earth silicate, mullite, or a mixture of mullite and of at least one rare earth silicate, the matrix including at least a first phase including mullite and a second phase, different from the first phase, including at least one rare earth silicate.

12 Claims, 2 Drawing Sheets

(51) Int. Cl.
*F01D 25/00* (2006.01)
*F23R 3/00* (2006.01)
*F01D 5/28* (2006.01)
*F01D 9/04* (2006.01)
*C04B 35/64* (2006.01)

(52) U.S. Cl.
CPC .. *C04B 35/62868* (2013.01); *C04B 35/62873* (2013.01); *C04B 35/62878* (2013.01); *C04B 35/62897* (2013.01); *C04B 35/64* (2013.01); *C04B 35/80* (2013.01); *C04B 35/803* (2013.01); *F01D 5/282* (2013.01); *F01D 5/284* (2013.01); *F01D 9/04* (2013.01); *F01D 25/005* (2013.01); *F23R 3/007* (2013.01); *C04B 2235/3224* (2013.01); *C04B 2235/3225* (2013.01); *C04B 2235/5244* (2013.01); *C04B 2235/5252* (2013.01); *C04B 2235/5256* (2013.01); *C04B 2235/5436* (2013.01); *C04B 2235/614* (2013.01); *C04B 2235/616* (2013.01); *C04B 2235/723* (2013.01); *C04B 2235/80* (2013.01); *C04B 2235/9669* (2013.01); *C04B 2235/9684* (2013.01); *F05D 2240/11* (2013.01); *F05D 2300/6033* (2013.01); *F23M 2900/05004* (2013.01)

(56) References Cited

FOREIGN PATENT DOCUMENTS

| | | | |
|---|---|---|---|
| CN | 104529498 A | 4/2015 | |
| EP | 1 479 657 A1 | 11/2004 | |
| JP | H02-296770 A | 12/1990 | |
| JP | H05-269716 A | 10/1993 | |
| WO | WO 2006/136755 A2 | 12/2006 | |
| WO | WO 2008/000247 A1 | 1/2008 | |
| WO | WO 2010/072978 A1 | 7/2010 | |
| WO | WO 2014/053751 A1 | 4/2014 | |
| WO | WO 2016/009148 A1 | 1/2016 | |
| WO | WO-2016009148 A1 * | 1/2016 | ............ C04B 35/80 |
| WO | WO 2017/060601 A1 | 4/2017 | |

OTHER PUBLICATIONS

International Search Report as issued in International Patent Application No. PCT/FR2017/051128, dated Aug. 9, 2017.

ATK Space Systems: "HI-NICALON™ Type S Ceramic Fiber," COI Ceramics, Inc., Jan. 2006, XP055349438, Retrieved from the Internet: URL: http://www.coiceramics.com/pdfs/hi-nicalon-types_1-17-06.pdf [retrieved on Feb. 24, 2017], 2 pages.

Dong, R., et al., "Influence of Heat Treatment of Phases, Microstructures and Mechanical Properties of Laminated Fabric (SiC and Aluminosilicate) / Mullite Matrix Composites (Part 2)," Journal of the Ceramic Society of Japan, vol. 113, No. 1314, Feb. 2005, XP055395048, pp. 135-142.

Office Action as issued in Chinese Patent Application No. 201780029402.6, dated Jan. 22, 2021.

Zhaofeng, C., "Inorganic Nonmetallic Materials Science—5.2 Ceramic Fiber," Northwestern Polytechnical University Press, Feb. 2016, p. 240.

Notice of Reasons for Refusal as issued in Japanese Patent Application No. 2018-559258, dated Mar. 2, 2021.

* cited by examiner

COMPOSITE MATERIAL PART

CROSS REFERENCE TO RELATED APPLICATIONS

This application is the U.S. National Stage of PCT/FR2017/051128 filed May 11, 2017, which in turn claims priority to French Application No. 1654200, filed May 11, 2016. The contents of both applications are incorporated herein by reference in their entirety.

BACKGROUND OF THE INVENTION

The invention relates to a part made of composite material that is usable at a temperature that is high, higher than or equal to 1300° C., e.g. in the range 1300° C. to 1450° C. The invention also relates to a method of fabricating such a part, and to a method of using it.

Various materials have been proposed in the state of the art for making turbine engine parts.

In particular, it is known to make use of ceramic matrix composite (CMC) materials that comprise fiber reinforcement made of silicon carbide fibers together with a matrix based on silicon carbide that is formed by chemical vapor infiltration (CVI). Such materials present very good characteristics concerning lifetime at temperatures of the order of 1300° C. or 1400° C., but they present a production cost that is relatively high because of using the CVI method. Other solutions have been developed in order to reduce the costs of producing parts made of CMC.

In this context, proposals have been made to form a composite material part comprising fiber reinforcement based on silicon carbide coated in an interphase coating and also a matrix formed by non-reactive or reactive melt infiltration (MI or RMI). Nevertheless, such a material may be limited to being used at temperatures lower than 1300° C. because of the presence of residual silicon in the matrix. Materials have also been proposed having oxide fiber reinforcement with an oxide matrix. Such materials present a production cost that is relatively low, but they are also limited in terms of utilization temperature.

It would therefore be desirable to provide materials that are compatible with utilization at a temperature higher than or equal to 1300° C., or even 1450° C., and that can be fabricated by a method of relatively low cost.

The present invention seeks to satisfy that need.

OBJECT AND SUMMARY OF THE INVENTION

To this end, in one of its aspects, the invention provides a part made of composite material comprising at least:
fiber reinforcement comprising silicon carbide fibers presenting an oxygen content less than or equal to 1% in atomic percentage; and
a matrix present in the pores of the fiber reinforcement and comprising at least one rare earth silicate, mullite ($3Al_2O_3.2SiO_2$), or a mixture of mullite and of at least one rare earth silicate.

The invention serves advantageously to provide a part that is compatible with use at a temperature higher than or equal to 1300° C. and that can be fabricated with a production cost that is relatively limited. In addition, since the matrix of the part comprises an environmental barrier material, the part of the invention can be used in an atmosphere that oxidizing and wet.

The matrix thus comprises at least one silicate phase. The silicate phase may comprise at least one rare earth silicate, mullite, or may indeed a mixed phase comprising a mixture of mullite and of at least one rare earth silicate.

In an embodiment, said rare earth silicate may have the chemical formula: $RE_2SiO_5$ or $RE_2Si_2O_7$, where RE designates a rare earth element. Preferably, the rare earth silicate has the chemical formula $RE_2Si_2O_7$.

The rare earth element RE may for example be selected from: Y (yttrium); Er (erbium); Yb (ytterbium); Lu (lutecium); and Dy (dysprosium). Preferably, the rare earth element RE may be selected from: Y; Yb; and Lu.

In an embodiment, the matrix may comprise at least a first phase comprising mullite and a second phase, different from the first phase, comprising at least one rare earth silicate.

It is advantageous to use such a matrix in order to still further reduce the cost of producing the part, insofar as incorporating mullite in the matrix is less expensive than incorporating a rare earth silicate.

In an embodiment, the first phase may be situated between the silicon carbide fibers and the second phase. In other words, under such circumstances, the first phase comprising mullite is situated beside the fibers, and the second phase comprising the rare earth silicate is situated beside the outside surface of the part.

In an embodiment, the matrix comprises:
at least one silicate phase comprising at least one rare earth silicate, mullite, or a mixture of mullite and of at least one rare earth silicate; and
an additional matrix phase made of ceramic material, different from the silicate phase, situated between the silicon carbide fibers and the silicate phase.

The presence of such an additional matrix phase serves advantageously to further improve the mechanical properties of the composite material part.

In an embodiment, the part may constitute a turbine engine part.

The part may be a hot part of a gas turbine of an aeroengine or of an industrial turbine. In particular, the part may constitute at least a portion of a distributor, of a wall of a combustion chamber, of a turbine ring sector, or of a turbine engine blade or vane.

The present invention also provides a method of fabricating a part as described above, comprising at least a step of forming the matrix in the pores of the fiber reinforcement.

In an implementation, at least a portion of the matrix may be formed by sintering.

Such a characteristic advantageously serves to fabricate the part using a technique that is of reduced cost to implement.

In an implementation, all of the matrix may be formed by sintering, or in a variant, it is possible for only a portion of the matrix to be formed by sintering.

In particular, a temperature higher than or equal to 1200° C. may be imposed during the sintering.

Such a characteristic is advantageous since it makes it possible to perform significant sintering so as to further improve the mechanical properties of the resulting part.

In an implementation, the matrix may be formed at least by performing the following steps:
introducing at least one powder of mullite or of at least one sol-gel precursor of mullite into the pores of the fiber reinforcement;
sintering the mullite that has been introduced or obtained after transforming the sol-gel precursor in order to form a first matrix phase comprising mullite;

introducing at least one powder of rare earth silicate or of at least one sol-gel precursor of rare earth silicate into the pores of the fiber reinforcement densified with the first matrix phase; and sintering the rare earth silicate that has been introduced or obtained after transforming the sol-gel precursor in order to form a second matrix phase comprising a rare earth silicate.

Such a method makes it possible to fabricate a matrix comprising both mullite and a rare earth silicate and it constitutes a solution that enables a part to be obtained having the desired properties at a cost of implementation that is particularly low.

The present invention also provides a method of using a part as described above, wherein the part is used at a temperature higher than or equal to 1300° C., and for example lying in the range 1300° C. to 1450° C. In particular, the part may be used in an atmosphere that is oxidizing and wet.

Given the natures of the materials used for forming the matrix, the part may advantageously have no environmental barrier coating while it is being used. Specifically, the matrix provides the part with the desired corrosion resistance. Nevertheless, it would not go beyond the ambit of the present invention if the part were to be used while provided with an environmental barrier coating.

BRIEF DESCRIPTION OF THE DRAWINGS

The invention can be better understood on reading the following description given below by way of non-limiting indication and with reference to the accompanying figures, in which.

DETAILED DESCRIPTION OF EMBODIMENTS

Figure 1:
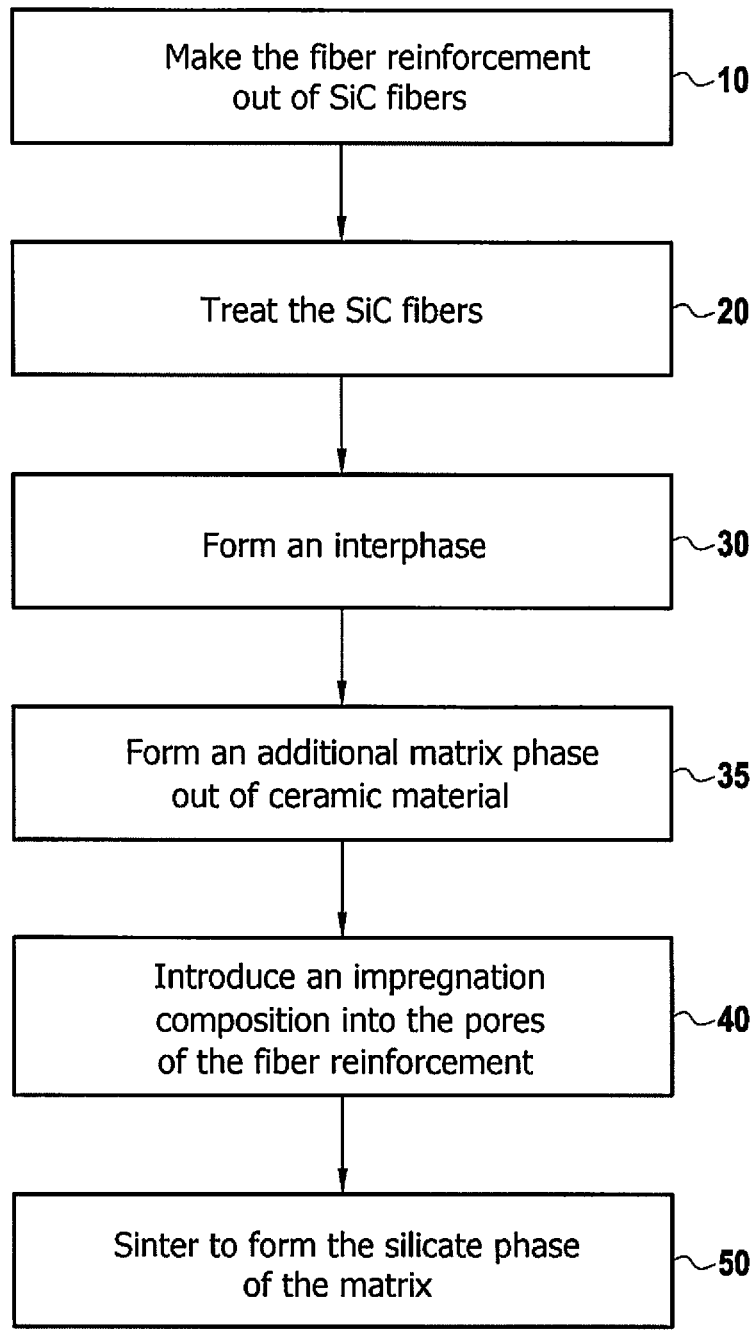
FIG. 1 shows successive steps in a first example of a method of fabricating a part of the invention.

Silicon carbide fibers presenting an oxygen content that is less than or equal to 1% in atomic percentage may for example be fibers supplied under the name "Hi-Nicalon-S" by the Japanese supplier NGS. These fibers are referred to below as "SiC fibers".

The fiber reinforcement can be made as a single piece by three-dimensional or multilayer weaving, or from a plurality of two-dimensional fiber plies, or indeed from a plurality of unidimensional fabric layers.

The term "three-dimensional weaving" or "3D weaving" should be understood as a weaving technique in which at least some of the warp yarns interlink weft yarns in a plurality of weft layers. In the present specification, it is possible to interchange roles between warp and weft, and that possible interchange should be considered as also being covered by the claims.

By way of example, the fiber reinforcement may present a multi-satin weave, i.e. be a fabric obtained by three-dimensional weaving with a plurality of weft yarn layers in which the weave of each layer is equivalent to a conventional satin type weave, but with certain points of the weave linking the weft yarn layers together. In a variant, the fiber reinforcement may present an interlock weave. The term "interlock" weave or fabric should be understood as meaning a 3D weave in which each layer of warp yarns links together a plurality of layers of weft yarns with all of the yarns in the same warp column having the same movement in the weave plane. Various multilayer weaving techniques suitable for use in forming the fiber reinforcement are described in particular in Document WO 2006/136755.

It is also possible to use fiber textures such as two-dimensional fabrics of SiC fibers or unidirectional sheets of SiC fibers, and to obtain the fiber reinforcement by draping such fiber textures onto a former. These textures may optionally be linked to one another, e.g. by stitching or by implanting yarns to form the fiber reinforcement.

SiC fibers may be coated by an interphase that is present between the SiC fibers and the matrix. The interphase may comprise a single layer or multiple layers. The interphase may include at least one layer of pyrolytic carbon (PyC), of boron nitride (BN), of silicon-doped boron nitride (BN(Si), with silicon being present at a percentage by weight lying in the range 5% to 40%, the balance being boron nitride) or of boron-doped carbon (BC, with boron being present at an atomic percentage lying in the range 5% to 20%, the balance being carbon). In such circumstances, the function of the interphase is to provide embrittlement relief for the composite material by helping to deflect any cracks that reach the interphase after propagating through the matrix, thereby preventing or retarding fiber rupture by such cracks.

The matrix densifies the fiber reinforcement by being present in the pores of the reinforcement. The matrix comprises at least one continuous silicate phase covering the fibers of the fiber reinforcement. The SiC fibers are present in the matrix. The matrix may occupy the majority (i.e. more than 50%) of the volume of the accessible pores in the fiber reinforcement. In particular, the matrix may occupy more than 75%, or indeed substantially all of the volume of the accessible pores.

The matrix comprises at least one silicate phase, comprising:

at least one rare earth silicate; or mullite; or a mixture of mullite and of at least one rare earth silicate.

The matrix may also advantageously include an additional matrix phase of ceramic material situated between the fibers (or the interphase) and the silicate phase. This additional phase serves to further improve the mechanical properties of the composite material part. This additional phase is constituted by a material different from that constituting the silicate phase. The additional phase may comprise a carbide or a nitride. By way of example, the additional phase may comprise SiC, $Si_3N_4$, SiN(O), SiC(B), or a mixture of such compounds. Naturally, when such an additional matrix phase is present, the residual pores remaining in the fiber reinforcement after the additional phase has been made are sufficient to enable the silicate phase to be formed. In a variant, the matrix need not have such an additional phase.

At least 50% by weight of the matrix may be constituted by at least one rare earth silicate, by mullite, or by a mixture of mullite and of at least one rare earth silicate. At least 80% by weight of the matrix may be constituted by at least one rare earth silicate, by mullite, or by a mixture of mullite and of at least one rare earth silicate. In particular, and ignoring unavoidable impurities, the matrix may be constituted entirely by at least one rare earth silicate, by mullite, or by a mixture of mullite and of at least one rare earth silicate.

In an embodiment, the matrix comprises a single rare earth silicate or a plurality of silicates of the same rare earth or of different rare earths. The rare earth silicate(s) may be of the form: $RE_2SiO_5$ or $RE_2Si_2O_7$, where RE designates a rare earth element. By way of example, RE may be selected from: yttrium Y, scandium Sc, and lanthanides, e.g. ytterbium Yb, lutecium Lu, dysprosium Dy, erbium Er, and lanthanum La. As mentioned above, the rare earth silicate(s) may advantageously be of the form $RE_2Si_2O_7$ with RE selected from the list: Y; Yb; and Lu.

A first example of a method of fabricating a part of the invention is described below with reference to FIG. 1.

A first step 10 may consist in making the fiber reinforcement out of SiC fibers. During step 10, the fiber reinforcement of the part may be obtained by performing at least one textile operation using SiC fibers. The fiber reinforcement may be obtained by multilayer or three-dimensional weaving of SiC fibers.

A step 20 of treating the surface of the SiC fibers prior to forming the interphase is preferably performed, in particular in order to eliminate the sizing present on the fibers.

A step 30 consists in forming an embrittlement relief interphase by CVI on the SiC fibers forming the fiber reinforcement. This interphase may be made of PyC. By way of example, the thickness of the interphase may lie in the range 10 nanometers (nm) to 1000 nm, e.g. in the range 10 nm to 100 nm. After the interphase has been formed, the fiber reinforcement remains porous, with only a minority fraction of the initially accessible pores being filled with the interphase.

A step 35 is then performed in which the additional ceramic matrix phase is formed in the pores of the fiber reinforcement on the previously-formed interphase. This additional phase may be formed by CVI.

Thereafter, during a step 40, an impregnation composition, e.g. in the form of a slurry, is introduced into the pores of the fiber reinforcement by methods that are themselves known, e.g. by injection. The impregnation composition may comprise a powder in suspension in a liquid medium or it may be in the form of a solution. The impregnation composition serves to deliver ingredients that are used in forming the silicate phase of the matrix. The impregnation composition may comprise a binder in known manner. The composition of the impregnation composition is determined as a function of the composition of the silicate phase that is to obtained. The impregnation composition may comprise at least one of the following ingredients: a powder of a rare earth silicate, a sol-gel precursor of a rare earth silicate, mullite powder, a sol-gel precursor of mullite, or a mixture of these compounds. In particular, the impregnation composition may comprise a) a mixture of a mullite powder and a sol-gel precursor of mullite, or b) a mixture of a mullite powder and a sol-gel precursor of rare earth silicate, or c) a mixture of a rare earth silicate powder and a sol-gel precursor of a rare earth silicate, or d) a mixture of a rare earth silicate powder and a sol-gel precursor of mullite, or e) a mixture of a mullite powder and a rare earth silicate powder, or indeed f) a mixture of a sol-gel precursor of a rare earth silicate and a sol-gel precursor of mullite. The mean size (D50) of the grains of the powder(s) present in the impregnation composition may be less than or equal to 5 micrometers (μm) or indeed to 1 μm.

Once the fiber reinforcement has been impregnated, it is dried and subjected to debinding, and then the silicate phase is formed by sintering (step 50). When one or more sol-gel precursors are used in the impregnation composition, prior to performing the heat treatment for sintering, first heat treatment is performed at a lower temperature for the purpose of converting the sol-gel precursor(s) into mullite powder and/or rare earth silicate powder.

The temperature imposed during sintering is advantageously higher than or equal to 1200° C., e.g. lying in the range 1200° C. to 1400° C. The SiC fibers constituting the fiber reinforcement present thermostability to the degree required for not being damaged during the step of sintering at such temperatures. Sintering the powder present in the fiber reinforcement above 1200° C. serves to further improve the mechanical properties presented by the resulting silicate phase. By way of example, the sintering may be performed in air.

FIG. 1 as described above illustrates the situation in which the matrix has only one silicate phase. Nevertheless, it would not go beyond the ambit of the invention for the matrix to comprise a plurality of distinct silicate phases, as described below with reference to FIG. 2.

Figure 2:
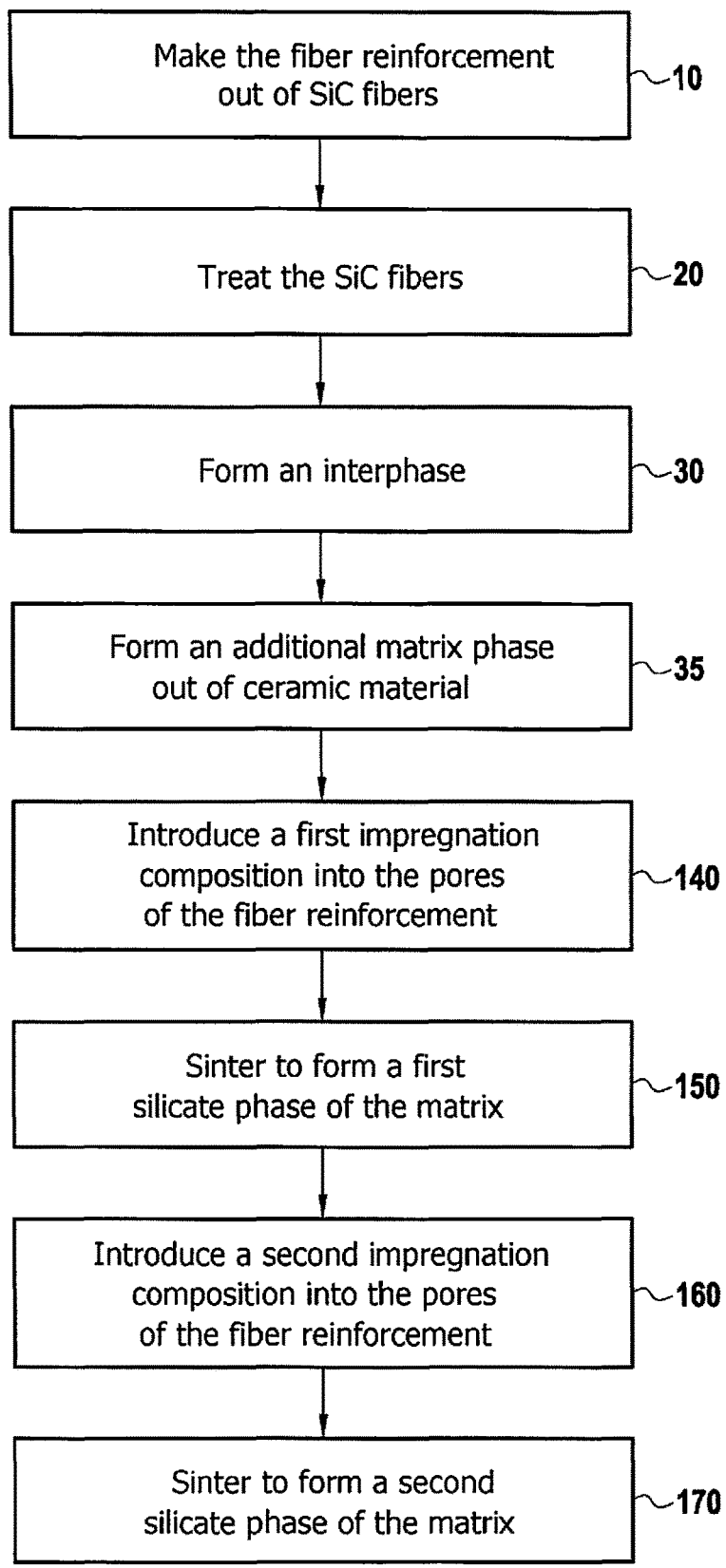
FIG. 2 shows the successive steps in a second example of a method of fabricating a part of the invention.

In the example method shown in FIG. 2, steps 10, 20, 30, and 35 are identical to those described above with reference to FIG. 1. After the additional matrix phase has been formed, a first impregnation composition is introduced into the pores of the fiber reinforcement (step 140). The first impregnation composition is as described above. The first impregnation composition serves to deliver the ingredients that are useful for forming a first silicate phase of the matrix after sintering (step 150).

After the first silicate phase has been formed, a second impregnation composition that is different from the first impregnation composition is introduced into the pores of the fiber reinforcement (step 160). The second impregnation composition is as described above. The second impregnation composition serves to deliver ingredients used in forming a second silicate phase of the matrix after sintering (step 170). The second silicate phase is constituted of a material that is different from the material constituting the first silicate phase.

Together the first and second silicate phases may occupy more than 50%, e.g. more than 75%, e.g. substantially all of the volume of the accessible pores of the fiber reinforcement.

It may be advantageous for at least one of the first and second silicate phases to include mullite in order to still further reduce the cost of producing the composite material part. Thus, the first silicate phase may comprise mullite and the second silicate phase may comprise at least one rare earth silicate. In a variant, the first silicate phase may comprise at least one rare earth silicate and the second silicate phase may comprise mullite. Mullite may represent 10% to 25% of the volume of the composite material part. The rare earth silicate may represent 5% to 30% of the volume of the composite material part.

In a variant that is not shown, after forming the silicate phase(s), it is possible to make a consolidating matrix phase that serves to further improve the cohesion of the resulting matrix. For this purpose, it is possible to impregnate the silicate phase(s) with a sol-gel precursor and then to perform heat treatment. The heat treatment begins with transforming the sol-gel precursor into the material of the consolidating matrix phase that is to be obtained, and is followed by sintering the material as obtained in this way in order to form the consolidating matrix phase.

The part may be a static part or a rotary part of a turbine engine. Example turbine engine parts of the invention are mentioned above.

Furthermore, as mentioned above, there is no need to make an environmental barrier coating on the outside surface of the resulting composite material part. This makes it possible to further simplify the method of fabricating a part that is suitable for use in an atmosphere presenting a high temperature and including water vapor. The resulting part may be used at a temperature higher than or equal to 1300° C., e.g. lying in the range 1300° C. to 1450° C., e.g. in the range 1300° C. to 1400° C. Naturally, it would not go beyond the ambit of the invention for the part to be used at a temperature lower than 1300° C.

In the implementations shown in FIGS. 1 and 2, the fiber reinforcement is formed initially and then at least one impregnation composition is introduced into its pores. Nevertheless, it would not go beyond the ambit of the present invention for the parts to be formed differently.

Thus, in a variant, the SiC fibers could be impregnated with an impregnation composition as described above, with the fiber reinforcement then being made by winding filaments of SiC fibers impregnated in this way. Thereafter, the fiber reinforcement could be subjected to a step of drying and debinding, and then sintering could be performed as described above in order to obtain the composite material part.

Also in a variant, unidirectional sheets could be formed using SiC fibers impregnated with an impregnation composition as described above. The fiber reinforcement could then be obtained by draping unidirectional sheets as formed in this way, and then the part could be formed by sintering as described above.

In another variant, the fiber reinforcement could be formed by draping a plurality of two-dimensional fiber plies that are preimpregnated with the impregnation composition.

In all three of the above-mentioned variants, it is naturally possible optionally to form an interphase on the SiC fibers prior to impregnation with the impregnation composition, the interphase being as described above.

The term "lying in the range . . . to . . . " should be understood as including the bounds.

The invention claimed is:

1. A part made of composite material comprising:
   fiber reinforcement comprising silicon carbide fibers presenting an oxygen content less than or equal to 1% in atomic percentage; and
   a matrix present in pores of the fiber reinforcement and comprising at least two sintered silicate phases, the matrix comprising at least a first phase comprising mullite and a second phase, different from the first phase, comprising at least one rare earth silicate, wherein at least 50% by weight of the matrix is constituted by a mixture of mullite and of the at least one rare earth silicate.

2. A part according to claim 1, wherein said rare earth silicate has the chemical formula: $RE_2SiO_5$ or $RE_2Si_2O_7$, where RE designates a rare earth element.

3. A part according to claim 2, wherein RE is selected from: Y; Yb; and Lu.

4. A part according to claim 1, wherein the first phase is situated between the silicon carbide fibers and the second phase.

5. A part according to claim 1, wherein the matrix further comprises:
   an additional matrix phase made of ceramic material, different from the first and second phases, the additional matrix phase situated between the silicon carbide fibers and the first and second phases.

6. A part according to claim 1, said part constituting a turbine engine part.

7. A part according to claim 6, the part constituting at least a portion of a distributor, of a wall of a combustion chamber, of a turbine ring sector, or of a turbine engine blade or vane.

8. A method of fabricating a part made of composite material, including fiber reinforcement comprising silicon carbide fibers presenting an oxygen content less than or equal to 1% in atomic percentage; and a matrix present in pores of the fiber reinforcement and comprising at least two sintered silicate phases, the matrix comprising at least a first phase comprising mullite and a second phase, different from the first phase, comprising at least one rare earth silicate, wherein at least 50% by weight of the matrix is constituted by a mixture of mullite and of the at least one rare earth silicate, the method comprising:
   forming the matrix in the pores of the fiber reinforcement, wherein the first and second phases are formed by sintering.

9. A method according claim 8, wherein a temperature higher than or equal to 1200° C. is imposed during the sintering.

10. A method according to claim 8, wherein the matrix is formed at least by performing the following steps:
    introducing at least one powder of mullite or of at least one sol-gel precursor of mullite into the pores of the fiber reinforcement;
    sintering the mullite that has been introduced or obtained after transforming the sol-gel precursor in order to form the first phase comprising mullite;
    introducing at least one powder of rare earth silicate or of at least one sol-gel precursor of rare earth silicate into the pores of the fiber reinforcement densified with the first matrix phase; and
    sintering the rare earth silicate that has been introduced or obtained after transforming the sol-gel precursor in order to form the second phase comprising the rare earth silicate.

11. A method comprising utilizing a part according to claim 1, comprising exposing the part to a temperature higher than or equal to 1300° C.

12. A method according to claim 11, wherein the part is exposed in an atmosphere that is oxidizing and wet.

* * * * *